United States Patent
Li et al.

(10) Patent No.: US 11,952,299 B2
(45) Date of Patent: Apr. 9, 2024

(54) GAS-LIQUID RECYCLING DEVICE AND METHOD OF USING SAME

(71) Applicant: SUZHOU UNIVERSITY OF SCIENCE AND TECHNOLOGY, Jiangsu (CN)

(72) Inventors: Xiang Li, Suzhou (CN); Yan Yuan, Suzhou (CN); Yong Huang, Suzhou (CN)

(73) Assignee: SUZHOU UNIVERSITY OF SCIENCE AND TECHNOLOGY, Jiangsu (CN)

( * ) Notice: Subject to any disclaimer, the term of this patent is extended or adjusted under 35 U.S.C. 154(b) by 265 days.

(21) Appl. No.: 17/430,867

(22) PCT Filed: Jan. 14, 2021

(86) PCT No.: PCT/CN2021/071741
§ 371 (c)(1),
(2) Date: Aug. 13, 2021

(87) PCT Pub. No.: WO2022/116368
PCT Pub. Date: Jun. 9, 2022

(65) Prior Publication Data
US 2022/0411299 A1    Dec. 29, 2022

(30) Foreign Application Priority Data

Dec. 3, 2020    (CN) .......................... 202011414659.3

(51) Int. Cl.
*C02F 3/22*    (2023.01)
*C02F 3/02*    (2023.01)
(Continued)

(52) U.S. Cl.
CPC ................ *C02F 3/22* (2013.01); *C02F 3/303* (2013.01); *F17D 1/02* (2013.01); *F17D 1/08* (2013.01);
(Continued)

(58) Field of Classification Search
CPC .... C02F 3/22; C02F 3/303; C02F 3/02; C02F 2203/006; F17D 1/02; F17D 1/08; Y02W 10/10
(Continued)

(56) References Cited

U.S. PATENT DOCUMENTS 4,009,098 A * 2/1977 Jeris .......................... C02F 3/06
                                                                210/604
8,597,507 B2 * 12/2013 Korzeniowski ........... C02F 1/78
                                                               210/195.3
2014/0158614 A1    6/2014 Wang

FOREIGN PATENT DOCUMENTS

CN        201250160 Y     6/2009
CN        103641240 A     3/2014
(Continued)

OTHER PUBLICATIONS

Machine-generated English translation of CN 111943444, generated on Jul. 12, 2023.*

(Continued)

*Primary Examiner* — Fred Prince
(74) *Attorney, Agent, or Firm* — Gearhart Law, LLC; David Postolski

(57) ABSTRACT

The disclosure relates to the technical field of energy saving and consumption reduction, and in particular, to a gas-liquid recycling device. A gas-liquid recycling device and a method of using same provided by the disclosure includes a gas-collection hood, a gas delivery pipe and a liquid delivery pipe. A gas inlet port of the gas delivery pipe is connected
(Continued)

to the gas collection hood, a gas outlet port of the gas delivery pipe is inserted into a liquid outlet port of the liquid delivery pipe, and a liquid inlet port is located at an end of the liquid delivery pipe opposite to the liquid outlet port.

17 Claims, 2 Drawing Sheets

(51) Int. Cl.
  *C02F 3/30* (2023.01)
  *F17D 1/02* (2006.01)
  *F17D 1/08* (2006.01)
(52) U.S. Cl.
  CPC .......... *C02F 3/02* (2013.01); *C02F 2203/006* (2013.01); *Y02W 10/10* (2015.05)
(58) Field of Classification Search
  USPC ........................................ 210/604, 603, 605
  See application file for complete search history.

(56) References Cited

FOREIGN PATENT DOCUMENTS

| | | |
|---|---|---|
| CN | 204874014 U | 12/2015 |
| CN | 106045044 A | 10/2016 |
| CN | 106630143 A | 5/2017 |
| CN | 109694130 A | 4/2019 |
| CN | 111943444 A | 11/2020 |

OTHER PUBLICATIONS

Machine-generated English translation of CN 106630143, generated on Jul. 12, 2023.*
Machine-generated English translation of CN 103641240, generated on Jul. 12, 2023.*
International Search Report and Written Opinion for PCT/CN2021/071741 (ISA/CN) dated Aug. 30, 2021 (12 pages).

* cited by examiner

GAS-LIQUID RECYCLING DEVICE AND METHOD OF USING SAME

CROSS-REFERENCE TO RELATED APPLICATIONS

This patent application is a national phase entry of International Application No. PCT/CN2021/071741, filed Jan. 14, 2021, which claims the benefit and priority of Chinese Patent Application No. 202011414659.3 filed on Dec. 3, 2020 and entitled "Gas-liquid Recycling Device", the contents of which are incorporated by reference herein in their entireties.

TECHNICAL FIELD

The disclosure relates to the technical field of energy saving and consumption reduction, and in particular, to a gas-liquid recycling device.

BACKGROUND ART

Sewage biochemical treatment has always been the most economical treatment method, and is widely applied to municipal sewage and industrial waste water treatments. During the sewage biochemical treatment, remaining sludge is returned to a front end of the sewage treatment process and mixed with incoming water. It is an indispensable process design to ensure sufficient concentration of microorganisms and freshness in the sewage treatment process. For this purpose, a sludge reflux pump is provided as an indispensable stage. On the other hand, due to an inherent sequence of organic matter and ammonia nitrogen being oxidized in turn and a need of organic matter subject to nitrogen removal by denitrification after the ammonia nitrogen is oxidized, a pre-denitrification process is developed. For this purpose, it is necessary to provide additionally a nitrification liquid reflux pump to return the nitrate after ammonia nitrogen oxidation to the front-end treatment process for nitrification treatment. However, as a concentration of ammonia nitrogen in incoming water increases, a reflux ratio of nitration liquid also increases. In the process of engineering application, one-tenth of the concentration of ammonia nitrogen is a reflux ratio, which has become an empirical formula. From this, it can be seen that the reflux rate is large. However, such reflux manner not only consumes a large amount of power consumption, but also increases operating cost of the process.

Moreover, when the nitrification process converts ammonia nitrogen into a nitrate, oxygen gas is required as an electron donor. Thus, a blower is required to blow a large amount of air into an aerobic tank for the nitrification reaction. It is well known that oxygen content in the air is less than 20%, and in consideration of an utilization ration of an aeration device and a mass transfer efficiency of oxygen contained in bubbles in water, final utilization ration of oxygen is less than 10%. In other words, 90% of kinetic energy consumed by the blower is not required by the nitrification process. It is very critical to realize sufficient utilization of the energy consumed and reduce cost of sewage treatment.

SUMMARY

The technical problems to be solved or the objectives to be achieved by the embodiments at least includes: providing a gas-liquid recycling device and a method for using same. The gas-liquid recycling device has a simple structure, and can reduce energy consumption of a sewage treatment process.

In order to achieve the above-mentioned purpose, the present disclosure provides the following technical solutions.

The present disclosure provides a gas-liquid recycling device, which includes a gas collection hood 1, a gas delivery pipe 2 and a liquid delivery pipe 3. The gas inlet port 2-1 of the gas delivery pipe 2 is connected to the gas collection hood 1. A gas outlet port 2-2 of the gas delivery pipe is inserted into a liquid outlet port 3-1 of the liquid delivery pipe 3. A liquid inlet port 3-2 is located at an end of the liquid delivery pipe 3 opposite to the liquid outlet port 3-1.

In some embodiments, the gas collection hood 1 may be a conical gas collection hood or a gas collection hood shaped into a quadrilateral pyramid. An inside of the gas collection hood 1 may be a hollow structure.

In some embodiments, a hollow gasbag 8 may be arranged outside a bottom of the gas collection hood 1.

In some embodiments, starting from the gas inlet port 2-1, the gas delivery pipe 2 may be provided with a discharge valve 5, a pressure gauge 4 and a flow gauge 6 in turn.

In some embodiments, a ratio of a diameter of the gas delivery pipe 2 to a diameter of the liquid delivery pipe 3 may be 1:(1.1-3).

In some embodiments, a solid-liquid separation pipe 9 communicated with the liquid delivery pipe 3 may be arranged on the liquid transport pipe (3) at a position close to the liquid inlet port 3-2. The liquid delivery pipe 3 may be arranged in a horizontal direction, and the solid-liquid separation pipe 9 is arranged perpendicular to the horizontal direction.

In some embodiments, a ratio of a diameter of the solid-liquid separation pipe 9 to the diameter of the liquid delivery pipe 3 may be (3-10):1.

In some embodiments, a gravity valve 7 may be provided at a bottom of the solid-liquid separation pipe 9.

The present disclosure further provides a method for using the gas-liquid recycling device according to the above-mentioned technical solution, which includes the following steps:

placing the liquid inlet port 3-2 of the liquid delivery pipe 3 at 1-1.5 m below a liquid supplying level of a liquid supplying device; placing the liquid outlet port 3-1 of the liquid delivery pipe 3 at 10-50 cm above a liquid requirement level of a liquid requirement device; placing the gas collection hood 1 in a gas generation device to collect gas; and refluxing the liquid at the outlet port 3-1 to the liquid requirement device by using the gas collected as power.

In some embodiments, when the gas-liquid recycling device may include a solid-liquid separation pipe 9, the method for using the gas-liquid recycling device may be performed by: placing the liquid inlet port 3-2 of the liquid delivery pipe 3 at 1.5-2.5 m from a bottom of the liquid supplying device; placing the liquid outlet port 3-1 of the liquid delivery pipe 3 at 10-50 cm above the liquid requirement level of the liquid requirement device; placing the gas collection hood 1 in the gas generation device to collect the gas; and refluxing the liquid at the liquid outlet port 3-1 to the liquid requirement device by using the gas collected as power.

The present disclosure provides a gas-liquid recycling device, which includes a gas collection hood 1, a gas delivery pipe 2 and a liquid delivery pipe 3. A gas inlet port 2-1 of the gas delivery pipe 2 is connected to the gas collection hood 1. A gas outlet port 2-2 of the gas delivery pipe is inserted into the liquid outlet port 3-1 of the liquid delivery pipe 3. A liquid inlet port 3-2 is located at an end of the liquid delivery pipe 3 opposite to the liquid outlet port 3-1. The gas-liquid recycling device of the embodiments collects the gas generated in the biochemical treatment process through a gas collection hood, and then uses the collected gas as power of liquid substance in the liquid delivery pipe to realize the refluxing of the liquid substance, which greatly reduces power consumption during a movement of the liquid substance. Moreover, the device has a simple structure, reduces frequencies of failure during device purchase and operation, greatly reduces process complexity, and is more environmentally friendly.

BRIEFT DESCRIPTION OF THE DRAWINGS

Figure 3:
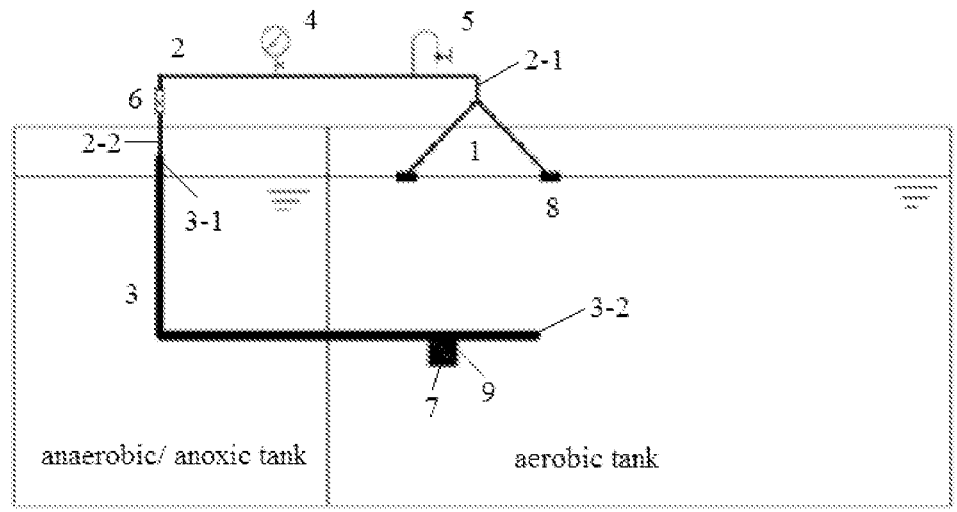
Figure 4:
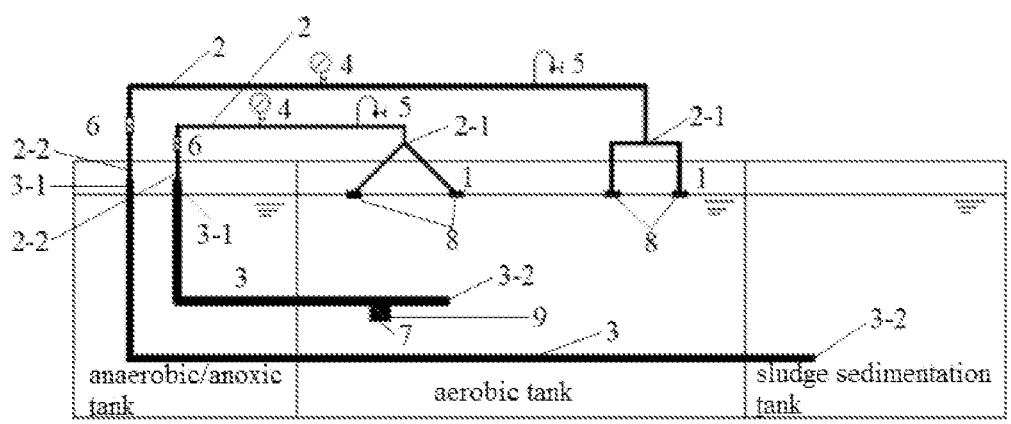

FIG. 3 is an configuration diagram for recycling and reusing waste liquid by using the gas-liquid recycling device with the solid-liquid separation pipe according to Embodiment 1 of the present disclosure; and FIG. 4 is an configuration diagram for recycling and reusing waste liquid by using the gas-liquid recycling device without the solid-liquid separation pipe and the gas-liquid recycling device with the solid-liquid separation pipe according to Embodiment 2 of the present disclosure.

List of the reference characters: 1 gas collection hood; 2 gas delivery pipe; 2-1 gas inlet port; 2-2 gas outlet port; 3 liquid delivery pipe; 3-1 liquid outlet port; 3-2 liquid inlet port; 4 pressure gauge; 5 discharge valve; 6 flow gauge; 7 gravity valve; 8 hollow gasbag; and 9 solid-liquid separation pipe.

DETAILED DESCRIPTION OF THE EMBODIMENTS

Figure 1:
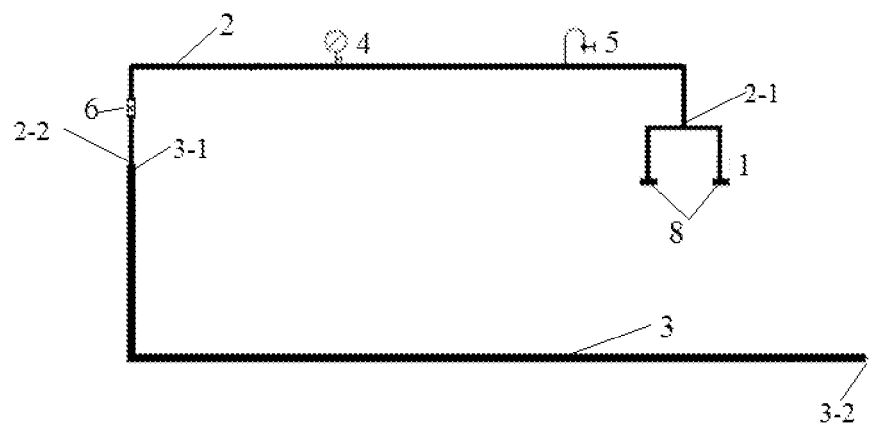
FIG. 1 is a structural schematic diagram of a gas-liquid recycling device without a solid-liquid separation pipe according to the present disclosure.

As shown in FIG. 1, the present disclosure provides a gas-liquid recycling device, which includes a gas collection hood 1, a gas delivery pipe 2 and a liquid delivery pipe 3. A gas inlet port 2-1 of the gas delivery pipe 2 is connected to the gas collection hood 1. A gas outlet port 22 of the gas delivery pipe is inserted into a liquid outlet port 31 of the liquid delivery pipe 3. A liquid inlet port 32 is located at an end of the liquid delivery pipe 3 opposite to the liquid outlet port 31.

As a specific embodiment of the present disclosure, the gas collection hood 1 is a conical gas collection hood or a gas collection hood shaped into a quadrilateral pyramid. An inside of the gas collection hood 1 is a hollow structure.

As a specific embodiment of the present disclosure, a hollow gasbag 8 is arranged outside a bottom of the gas collection hood 1. The hollow gasbag 8 is preferably located around the outside of the bottom of the gas collection hood 1.

As a specific embodiment of the present disclosure, starting from the gas inlet port 2-1, the gas delivery pipe 2 is provided with a discharge valve 5, a pressure gauge 4 and a flow gauge 6 in turn. The discharge valve 5 is configured to discharge excess gas when the gas in the gas collection hood 1 is excessive. The pressure gauge 4 and the flow gauge 6 are configured to control the flow rate of the liquid substance in the liquid delivery pipe by controlling the flow rate of the gas.

As a specific embodiment of the present disclosure, a ratio of a diameter of the gas delivery pipe 2 to a diameter of the liquid delivery pipe 3 is 1:(1.1-3). In the present disclosure, when the gas-liquid recycling device is in use, the gas outlet port (22) is inserted below the liquid level of the liquid substance in the liquid delivery pipe 3. In the present disclosure, a height of the gas delivery pipe 2 immersed below the liquid level upon the gas outlet port (2-2) being inserted into the liquid delivery pipe 3 may be adjusted according to actual needs.

Figure 2:
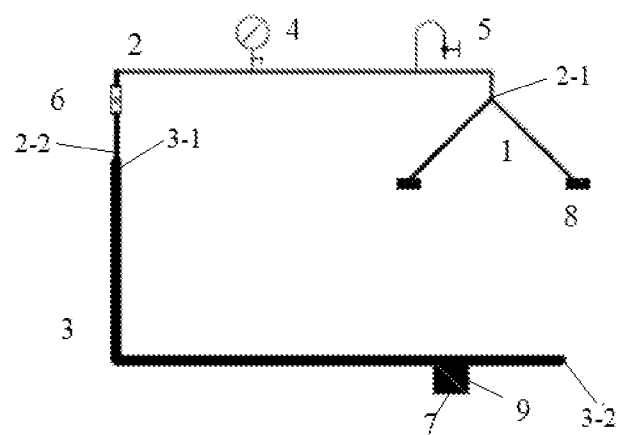
FIG. 2 is a structural schematic diagram of a gas-liquid recycling device with a solid-liquid separation pipe according to the present disclosure.

As shown in FIG. 2, as a specific embodiment of the present disclosure, a solid-liquid separation pipe 9 is arranged on a position close to the liquid inlet port 3-2. The solid-liquid separation pipe 9 is communicated with the liquid delivery pipe 3. The liquid delivery pipe 3 is arranged in a horizontal direction, and the solid-liquid separation pipe 9 is arranged perpendicular to the horizontal direction.

As a specific embodiment of the present disclosure, a ratio of a diameter of the solid-liquid separation pipe 9 to the diameter of the liquid delivery pipe 3 is (3-10):1.

As a specific embodiment of the present disclosure, a gravity valve 7 is provided at a bottom of the solid-liquid separation pipe 9.

In the present disclosure, when the liquid substance flowing from the liquid inlet port 31 into the liquid delivery pipe 3 is a suspension containing solid substances, and the liquid flowing out of the liquid outlet port contains no solid substance or few solid substances, the solid-liquid separation pipe 9 is provided preferably. Since the diameter of the solid-liquid separation pipe 9 is larger than the diameter of the liquid delivery pipe, solid-liquid separation is implemented in the solid-liquid separation pipe 9 by natural sedimentation. After the solid substances settled in the solid-liquid separation pipe 9 reach a certain amount, the gravity valve 7 provided at the bottom of the solid-liquid separation pipe 9 automatically opens to separate the settled solid substances. In the present disclosure, a number of the solid-liquid separation pipes 9 is preferably greater than or equal to 1, and the number of the solid-liquid separation pipes 9 is set according to actual needs.

In the present disclosure, during the use of the gas-liquid recycling device, the number of the gas-liquid recycling device can be increased according to actual needs. For example, when there are more than one device for supplying liquid or more than one device which require liquid, a number of the gas-liquid recycling devices may be increased.

In the present disclosure, when the gas-liquid recycling device does not include the solid-liquid separation pipe, the method for using the gas-liquid recycling device is: placing the liquid inlet port 3-2 of the liquid delivery pipe 3 at 1-1.5 m below a liquid supplying level of a liquid supplying device, placing the liquid outlet port 3-1 of the liquid delivery pipe 3 at 10-50 cm above a liquid requirement level of a liquid requirement device; placing the gas collection hood 1 in a gas generation device to collect the gas; and controlling a flow of the liquid substance in the liquid delivery pipe 3, by controlling the pressure gauge 4 and the flow gauge 6 to in turn control a flow rate of the gas.

When the gas-liquid recycling device includes the solid-liquid separation pipe 9, the method for using the gas-liquid recycling device is: placing the liquid inlet port 3-2 of the liquid delivery pipe 3 at 1.5-2.5 m from a bottom of the liquid supplying device; placing the liquid outlet port 3-1 of the liquid delivery pipe 3 at 10-50 cm above the liquid requirement level of the liquid supplying device; placing the gas collection hood 1 in the gas generation device to collect the gas; and controlling the flow of the liquid substance in the liquid delivery pipe 3 by controlling the pressure gauge 4 and the flow gauge 6 to in turn control the flow rate of the gas.

The gas-liquid recycling device provided by the present disclosure will be described in detail below with reference to the embodiments, but they cannot be construed as limiting the scope of protection of the present disclosure.

Embodiment 1

Traditional sewage treatment technology including anaerobic/anoxic tank and aerobic tank is used to treat sewage with an ammonia-nitrogen concentration of 200 mg/L and a COD concentration of 1500 mg/L, and one gas-liquid recycling device is used to replace a nitrification liquid reflux pump to achieve nitrification liquid refluxing.

Nitrification liquid refluxing is achieved by: providing a nitrification liquid delivery pipe in an aerobic tank and an anaerobic/anoxic tank, so that the nitrification liquid delivery pipe in the aerobic/anaerobic tank is placed at 30 cm above the water level, the nitrification liquid delivery pipe in the aerobic tank is placed at 1 m below the liquid level; and arranging a cone gas collection hood above a liquid level of the aerobic zone to collect the gas aerated in the aerobic zone; refluxing the nitrification liquid in the aerobic zone to the anaerobic/hypoxia zone by using the collected gas as power; and discharging the gas through the discharge valve. The flow of the nitrification liquid refluxed is controlled to be 800% of the flow of the incoming water.

Embodiment 2

Traditional sewage treatment technology including an anaerobic/anoxic tank, aerobic tank and sludge sedimentation tank is used to treat sewage with an ammonia nitrogen concentration of 200 mg/L and a COD concentration of 1500 mg/L, and two gas-liquid recycling devices are used to replace a nitrification liquid reflux pump and a sludge reflux pump to achieve nitrification liquid refluxing and sludge refluxing.

Nitrification liquid refluxing is achieved by: providing a nitrification liquid delivery pipe in an aerobic tank and an anaerobic/hypoxia tank, so that the nitrification liquid delivery pipe in the aerobic/anaerobic tank is placed at 30 cm above the liquid level, the nitrification liquid delivery pipe in the aerobic tank is placed at 1 m below the liquid level; arranging a cone gas collection hood above a liquid level of the aerobic zone to collect the gas aerated in the aerobic zone; refluxing the nitrification liquid in the aerobic zone to the anaerobic/hypoxia zone by using the collected gas as power; and discharging the gas through the discharge valve. The flow of the nitrification liquid refluxed is controlled to be 800% of the flow of the incoming water.

Sludge refluxing is achieved by: connecting a sludge liquid delivery pipe with the sludge sedimentation tank and the anaerobic/anoxic tank, so that the sludge liquid delivery pipe in the anaerobic/anoxic tank is placed at 30 cm above a liquid level, and the sludge liquid delivery pipe in the sludge sedimentation tank is placed at a distance of 2 m from the bottom; placing a gas collection hood shaped into a quadrilateral pyramid above the liquid level of the aerobic tank to collect the gas aerated; refluxing the sludge of the sludge sedimentation tank to the anoxic/anaerobic tank by using the gas; and discharging the gas through the control valve. The flow of the sludge is controlled to be 100% of the incoming liquid.

Through the design of the sludge return device and the nitrification liquid reflux device, it can be realized that the sludge of the aerobic tank and the sludge of the anoxic tank is stabilized at 3500 mg/L, the total nitrogen removal rate is greater than 95%, the effluent ammonia nitrogen is less than 20 mg/L, the total nitrogen is less than 40 mg/L, the COD is less than 100 mg/L, and the discharge standard of the urban sewage receiving pipe is satisfied. The whole operation process saves the construction cost of the nitrification liquid reflux pump and the sludge reflux pump, maintenance cost and power consumption.

The description of the above embodiments is only used for help understand the method and core idea of the present disclosure. It should be pointed out that, for a person of ordinary skill in the art, several improvements and modifications can be made to the present disclosure without departing from the principle of the present disclosure, and these improvements and modifications also belong to the scope of protection of the claims of the present disclosure. Various modifications to these embodiments will be apparent to those skilled in the art, and the general principles defined herein may be implemented in other embodiments without departing from the spirit or scope of the disclosure. Accordingly, the present disclosure will not be limited to the embodiments shown herein, but shall accord with the widest scope consistent with the principles and novel features disclosed herein.

What is claimed is:

1. A gas-liquid recycling device, comprising a gas collection hood, a gas delivery pipe and a liquid delivery pipe; wherein a gas inlet port of the gas delivery pipe is connected to the gas collection hood;

a gas outlet port of the gas delivery pipe is inserted into a liquid outlet port of the liquid delivery pipe; and a liquid inlet port is located at an end of the liquid delivery pipe opposite to the liquid outlet port;

wherein a hollow gasbag is arranged outside a bottom of the gas collection hood.

2. The gas-liquid recycling device as claimed in claim 1, wherein the gas collection hood is a conical gas collection hood or a gas collection hood shaped into a quadrilateral pyramid; and an inside of the gas collection hood is a hollow structure.

3. The gas-liquid recycling device as claimed in claim 1, wherein starting from the gas inlet port, the gas delivery pipe is provided with a discharge valve, a pressure gauge and a flow gauge in turn.

4. The gas-liquid recycling device as claimed in claim 3, wherein a ratio of a diameter of the gas delivery pipe to a diameter of the liquid delivery pipe is 1:(1.1-3).

5. The gas-liquid recycling device as claimed in claim 1, wherein a ratio of a diameter of the gas delivery pipe to a diameter of the liquid delivery pipe is 1:(1.1-3).

6. The gas-liquid recycling device as claimed in claim 1, wherein a solid-liquid separation pipe in communication with the liquid delivery pipe is arranged on the liquid delivery pipe at a position close to the liquid inlet port; and the liquid delivery pipe is arranged in a horizontal direction, and the solid-liquid separation pipe is arranged perpendicular to the horizontal direction.

7. The gas-liquid recycling device as claimed in claim 6, wherein a ratio of a diameter of the solid-liquid separation pipe to a diameter of the liquid delivery pipe is (3-10):1.

8. The gas-liquid recycling device as claimed in claim 7, wherein a gravity valve is provided at a bottom of the solid-liquid separation pipe.

9. The gas-liquid recycling device as claimed in claim 6, wherein a gravity valve is provided at a bottom of the solid-liquid separation pipe.

10. A method for using a gas-liquid recycling device, which comprises a gas collection hood, a gas delivery pipe and a liquid delivery pipe; wherein
- a gas inlet port of the gas delivery pipe is connected to the gas collection hood;
- a gas outlet port of the gas delivery pipe is inserted into a liquid outlet port of the liquid delivery pipe; and
- a liquid inlet port is located at an end of the liquid delivery pipe opposite to the liquid outlet port;

wherein a hollow gasbag is arranged outside a bottom of the gas collection hood;

the method comprising the following steps:
placing the liquid inlet port of the liquid delivery pipe at 1-1.5 m below a liquid supplying level of a liquid supplying device; placing the liquid outlet port of the liquid delivery pipe at 10-50 cm above a liquid requirement level of a liquid requirement device; placing the gas collection hood in a gas generation device to collect gas; and refluxing a liquid at the liquid outlet port to the liquid requirement device by using the gas collected as power.

11. The method as claimed in claim 10, wherein when the gas-liquid recycling device comprises a solid-liquid separation pipe, the method for using the gas-liquid recycling device is performed by: placing the liquid inlet port of the liquid delivery pipe at 1.5-2.5 m from a bottom of the liquid supplying device; placing the liquid outlet port of the liquid delivery pipe at 10-50 cm above the liquid requirement level of the liquid requirement device; placing the gas collection hood in the gas generation device to collect the gas, and refluxing the liquid at the liquid outlet port to the liquid requirement device by using the gas collected as power.

12. The method as claimed in claim 10, wherein the gas collection hood is a conical gas collection hood or a gas collection hood shaped into a quadrilateral pyramid; and an inside of the gas collection hood is a hollow structure.

13. The method as claimed in claim 10, wherein starting from the gas inlet port, the gas delivery pipe is provided with a discharge valve, a pressure gauge and a flow gauge in turn.

14. The method as claimed in claim 10, wherein a ratio of a diameter of the gas delivery pipe to a diameter of the liquid delivery pipe is 1:(1.1-3).

15. The method as claimed in claim 10, wherein a solid-liquid separation pipe in communication with the liquid delivery pipe is arranged on the liquid delivery pipe at a position close to the liquid inlet port; and
the liquid delivery pipe is arranged in a horizontal direction, and the solid-liquid separation pipe is arranged perpendicular to the horizontal direction.

16. The method as claimed in claim 10, wherein a ratio of a diameter of the solid-liquid separation pipe to a diameter of the liquid delivery pipe is (3-10):1.

17. The method as claimed in claim 10, wherein a gravity valve is provided at a bottom of the solid-liquid separation pipe.

* * * * *